Figure 1:
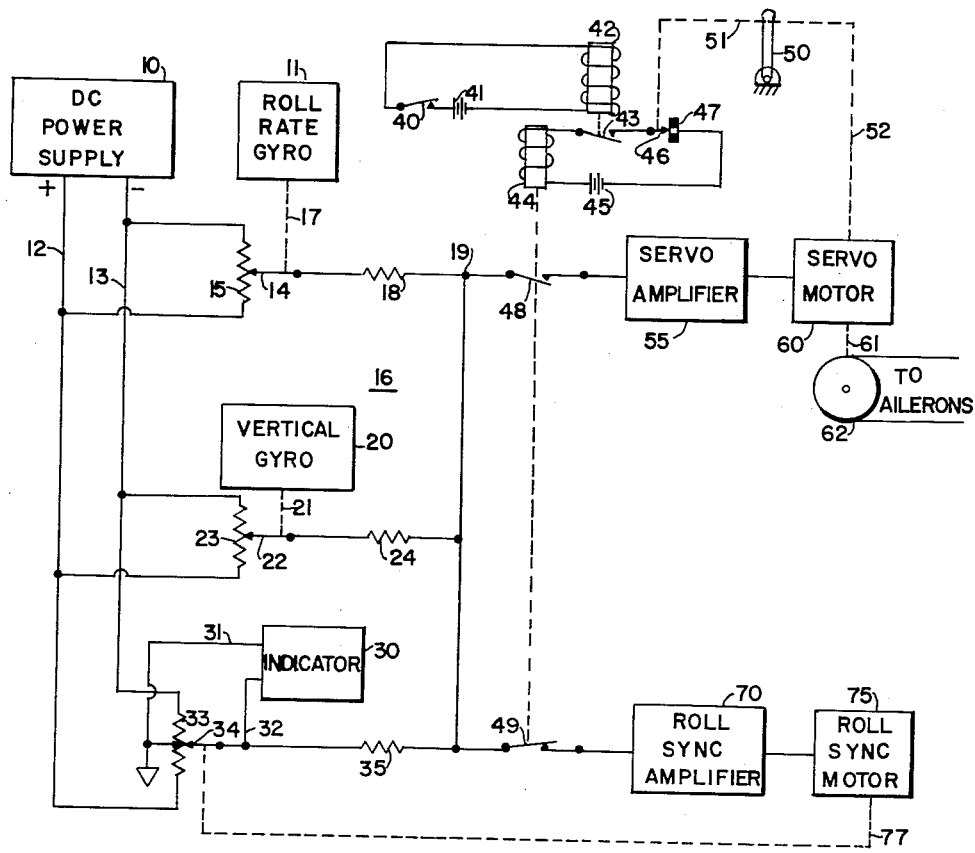

Oct. 10, 1961  T. W. CHASE  3,003,720

AUTOMATIC PILOT

Filed July 8, 1958

INVENTOR.
THOMAS W. CHASE
BY *Vernon A. Johnson*
ATTORNEY

United States Patent Office 3,003,720
Patented Oct. 10, 1961

3,003,720
AUTOMATIC PILOT
Thomas W. Chase, Minneapolis, Minn., assignor to Minneapolis-Honeywell Regulator Company, Minneapolis, Minn., a corporation of Delaware
Filed July 8, 1958, Ser. No. 747,139
6 Claims. (Cl. 244—77)

This invention pertains to the field of aircraft control. The apparatus embodying this invention is associated with control surfaces of the aircraft whereby the control surfaces may be operated to control predetermined maneuvers of the aircraft.

It is well known in autopilot design to operate a synchronizing motor while flying an aircraft manually and before engaging the autopilot, and thereby drive a synchronizing potentiometer or other signal device to balance the autopilot bridge, thereby preventing a "bump" when the autopilot is engaged. A displacement signal, such as a signal from a vertical gyro potentiometer, is ordinarily used to drive such a synchronizer. Thus, before engaging the autopilot, the sum of the signal from the vertical gyro potentiometer and the signal from the bank synchronizer potentiometer is applied to the synchronizing amplifier. The amplified signal drives a synchronizing motor, which in turn drives the bank synchronizing potentiometer in such a direction as to null out the signal from the vertical gyro potentiometer. When such a synchronizer is applied to the aileron axis of the aircraft, it is seen that regardless of the bank angle upon engaging the autopilot, the vertical gyro roll signal will be balanced out and there will be no sudden aileron movement and resultant "bump."

In some autopilot systems, this synchronization feature is combined with control stick steering, whereby the signal from the synchronizing potentiometer is used as a reference signal for a predetermined flight attitude. For example, if the pilot elects to bank the aircraft from level flight with the autopilot engaged, movement of the control stick causes the roll potentiometer of the vertical gyroscope to be disconnected from the aileron servomotor and connected to the synchronizing motor. The synchronizing motor then operates to null the vertical gyro signal until the desired roll attitude is achieved. When the pilot then releases his control stick, the synchronizing motor is disconnected from the circuit, and the aileron servomotor is connected to the summing point of the vertical gyro and roll synchronizing potentiometers. Thereafter, the roll synchronizing potentiometer signal is held at the fixed value corresponding to the bank angle at which the stick was released, since the synchronizing motor no longer operates, and the aircraft holds the selected bank angle with the vertical gyro acting to stabilize the attitude of the aircraft.

In some high speed aircraft, it is noted that sudden release of the stick when a predetermined roll attitude is reached, thereby fixing a reference voltage at the synchronizing potentiometer, causes the aircraft to hunt back and forth for the desired attitude. This is due to the rolling velocity of the aircraft, which causes the aircraft to overshoot the attitude at which the stick was released, whereafter the airplane reverses its rolling movement until the signal from the vertical gyro roll potentiometer corresponds to the fixed signal at the synchronizer potentiometer. This tendency of a movable craft to overshoot a desired attitude has been found to be undesirable.

It is, therefore, the main object of my invention to provide an improved synchronizer circuit for a dirigible craft control system wherein said synchronizer circuit operates to permit movement of the craft from one position to another without overshooting the desired new position.

A further object of my invention is to provide a synchronizer circuit of the type described wherein a rate sensing device is used to anticipate the tendency of the craft to overshoot the desired new position.

I have accomplished these objects by using a synchronizing potentiometer signal to null the sum of a displacement signal from a vertical gyro and a rate signal from a device such as a rate gyroscope. The signal from the synchronizing potentiometer is arranged to exceed the signal from the vertical gyroscope by an amount equal to the signal from the rate gyroscope. When a control stick maneuver is initiated, the synchronizer signal will always be slightly larger than the displacement signal from the vertical gyro, thus when the control stick is released at the desired attitude, as indicated by the signal at the synchronizer potentiometer, the angular velocity of the aircraft causes the displacement signal from the vertical gyroscope to gradually increase until it equals and is thereby nulled by the signal from the synchronizer potentiometer, at which point the signal from the rate gyroscope will have gradually decreased to zero. The signal from the rate gyroscope is thereby used to anticipate the tendency of an aircraft to continue its change of attitude after the control signal has been terminated.

Figure 2:
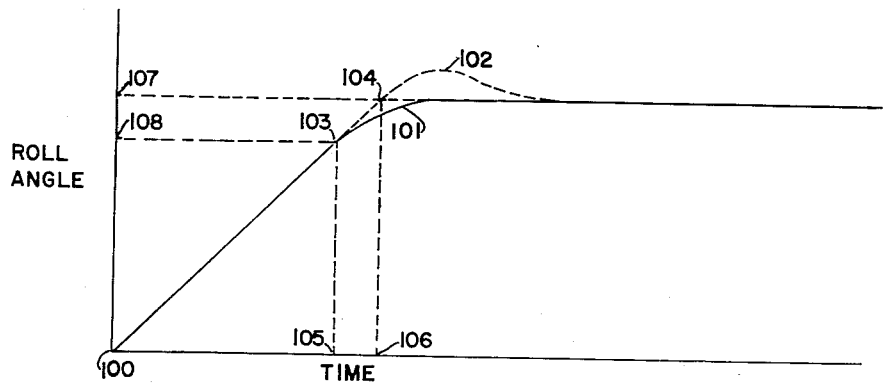

Other objects and features of my invention will be ascertained by a study of the accompanying description of a preferred embodiment of my invention together with the single sheet of drawing in which:

FIGURE 1 is a schematic diagram of the preferred embodiment of my invention as used in connection with the roll channel of an aircraft, and FIGURE 2 is a graph illustrating the operation of the circuit shown in FIGURE 1.

*General description*

In FIGURE 1, I have shown my invention in the aileron channel of an aircraft autopilot. It should be understood, however, that my invention may be used in connection with other types of control systems, and more particularly, in other control axes of an aircraft autopilot.

An autopilot bridge 16 of the D.C. type is shown, with resistors 15, 23, and 33 connected in parallel by means of leads 12 and 13 to D.C. power supply 10. In the preferred embodiment of my invention, the power supply is connected to supply +50 volts at lead 12, and —50 volts at lead 13, thereby causing the center points of resistors 15, 23, and 33 to be at zero potential.

Roll rate gyroscope 11 is mechanically connected, by means of shaft 17, to drive potentiometer wiper 14 across resistor 15. Thus, wiper 14 which is normally positioned at the center or no voltage point of resistor 15, is caused to transmit a voltage through resistor 18 to summing point 19 of bridge 16 whenever the roll rate gyro causes wiper 14 to move away from the center position of resistor 15. Although a gyroscope has been shown as a roll rate sensing device, it should be understood that another type of sensor such as a displacement or acceleration sensor could be used in connection with a suitable differentiating or integrating device.

Vertical gyroscope 20 is connected, by means of connection 21, to drive potentiometer wiper arm 22 across potentiometer resistor 23. When the aircraft is in level flight, and there is no signal from the vertical gyroscope, wiper arm 22 is positioned at the center or no voltage position of resistor 23. However, when the aircraft moves about its roll axis, the vertical gyroscope senses this movement and moves wiper 22 so as to cause a resultant voltage to be transmitted by way of summing resistor 24 to summing point 19 of bridge 16. Although a vertical gyroscope is shown, it should be understood that any suitable device capable of sensing displacement signals could be used to drive wiper arm 22.

Roll synchronizing motor 75, which will be explained in greater detail below, drives potentiometer wiper arm 34 through connection means 77. Thus, operation of roll synchronizing motor 75 causes wiper 34 to move away from the grounded center position of resistor 33 and thereby causes a voltage to be transmitted through resistor 35 to summing point 19 of bridge 16. The voltage between wiper 34 and signal ground is connected by leads 31 and 32 to indicator 30.

A simplified autopilot engaging circuit, consisting of two relays and their associated circuits, is shown at the upper right-hand corner of FIGURE 1. The manual closing of autopilot engaging switch 40 completes a circuit including battery 41 for operating relay 42. Operation of relay 42 closes contact 43 to thereby complete an operating circuit for relay 44, including battery 45, wiper arm 46, and the center conducting portion of member 47. Operation of relay 44 closes contact 48 and opens contact 49, thereby connecting summing point 19 to the input of servomotor amplifier 55. Any unbalance in bridge circuit 16 is applied from summing point 19 to discriminator amplifier 55 which controls servomotor 60 to cause the operation of output member 61 in accordance with the extent of unbalance of network 16. Thus, closing of autopilot engage switch 40, causes the D.C. bridge signals from wipers 14, 22 and 34 to operate servomotor 60 and thereby operate the ailerons of the aircraft by means of shaft 61 and operating means 62.

Servomotor 60 is arranged to be controlled by either of two signal sources. One source is the servomotor amplifier 55, which controls servomotor 60. A second control means comprises connection 52 whereby movement of control stick 50 is arranged to control servomotor 60 directly and thereby move the aircraft ailerons. When stick 50 is moved by the pilot to roll the aircraft, connection means 51 moves wiper 46 away from the center conducting portion and onto the nonconducting outer portions of member 47. Thus, a control stick turn of the aircraft causes relay 44 to be de-energized, thereby opening contact 48 and closing contact 49. The voltage at summing point 19 is thereby connected through contact 49 to the input of the roll synchronizing amplifier.

Roll synchronizing amplifier 70, which is a conventional discriminating amplifier similar to amplifier 55, is arranged to amplify the control signal to the level necessary for operation of roll synchronizing motor 75. Roll synchronizing motor 75 is also of conventional design, and arranged to drive potentiometer wiper 34 by means of connection 77. This amplifier and motor are preferably of the D.C. type shown as items 28 and 29 in Patent 2,733,878 to Ciscel. It should be understood, however, that a vibrator could be used in connection with a conventional A.C. amplifier and servomotor to operate 77.

In FIGURE 2, I have shown graphs of Roll Angle vs. Time, where the change in roll angle is caused by movement of the control stick. Curve 102 shows the "overshooting" type of approach to a desired roll attitude that is achieved with known autopilot systems, and curve 101 shows the improved approach to the desired roll angle that is achieved through use of my invention. These curves will be discussed in greater detail below.

*Detailed operation*

With the above general description of my invention in mind, I will now describe the operation of my invention with reference to specific flight conditions and examples. First, consider the operation of the system before auto-pilot engage switch 40 is closed. Relay 44 remains de-energized, thereby holding contact 48 open and contact 49 closed. Changes in roll attitude of the aircraft will cause operation of the roll rate and vertical gyroscopes, and a resultant voltage at summing point 19 which is the output of D.C. bridge 16. The signal voltage at summing point 19 operates roll synchronizing amplifier 70 and roll synchronizing motor 75, thereby driving potentiometer wiper 34 by means 77. The circuit is arranged so that wiper 34 is moved in a direction to null the sum of the roll rate and vertical gyro signals, thereby maintaining zero potential at summing point 19. Since zero potential is maintained at summing point 19 during pre-engagement flight maneuvers, it is obvious that when the autopilot is engaged, there will be no sudden voltage applied from summing point 19 to the servoamplifier and motor, to thereby cause a sudden movement of the ailerons and a resultant "bump." Thus, the operation of the roll synchronizing motor prior to autopilot engagement, makes it possible to engage the autopilot at any flight attitude without causing any adverse effects to aircraft stability.

Now assume that the pilot engages the autopilot, by closing switch 40, while the aircraft is in a level flight attitude. Since this occurs at level flight, the wipers of the roll rate and vertical gyro potentiometers will be at the center of their corresponding resistors, thereby having zero signal output. The wiper 34, actuated by the roll synchronizing motor, is also at the center or grounded position on resistor 33 due to the operation of roll synchronizing motor 75 which maintains summing point 19 at null. Thus, when relay 44 is energized, closing contact 48 and opening contact 49, there is zero voltage at point 19 and therefore no signal voltage is available to move the ailerons of the aircraft. Since contact 49 is then opened, there can be no further operation of the roll synchronizer motor, and therefore wiper 34 remains at the grounded center tap of resistor 33 regardless of subsequent vertical or rate gyroscope signals caused by wind gusts, down drafts, etc. The vertical and rate gyroscope signals are then effective to hold the aircraft in the level flight attitude at which the autopilot was engaged.

In order to make a right roll of, for example thirty degrees, the pilot moves the control stick 50 to his right, thereby directly controlling the servomotor to cause the rolling movement, and simultaneously opening the circuit of relay 44. Relay 44 is thereby de-energized, and contact 48 opens to disconnect servomotor 60 from autopilot bridge 16, whereas contact 49 closes to connect roll synchronizing motor 75 to the bridge. In order to more clearly demonstrate the improved operation that I obtain with a rate sensing device, I will now continue this description on the basis that a rate sensing device was not used, and the change in roll attitude would therefore be sensed only by the vertical gyro. Assuming that a thirty degree right roll causes a negative 30 volts at wiper 22, and that equal summing resistors 24 and 35 are used, then the roll synchronizing motor would operate wiper 34 by means of connecting means 77 so as to cause a positive thirty volts to appear at wiper 34, thereby maintaining summing point 19 at null potential. This thirty volt positive potential at wiper 34 would cause indicator 30 to show a thirty degree right bank, and the pilot would then release the control stick. With reference to FIGURE 2, the roll maneuver started at point 100, and the stick was released at point 104 on curve 102. Release of stick 50 closes contact 48 and opens contact 49, thereby holding wiper 34 at the positive thirty volt position on resistor 33. However, due to the angular velocity of the aircraft, the aircraft would continue to roll along curve 102 thereby increasing the roll angle, whereafter the aircraft reverses its rolling movement until the desired thirty degree roll angle, as indicated by point 107, is achieved. Although release of the control stick causes the ailerons to streamline, the stability of the aircraft is such that the thirty degree roll attitude is maintained. The positive thirty volts at wiper 34 is thereafter balanced by a negative thirty volts at vertical gyro wiper 22, and if the aircraft moves away from this thirty degree attitude, the resultant signal at summing point 19 causes operation of servomotor 60 and thereby controls the aircraft back to the thirty degree bank attitude. Thus, the fixed potential at wiper 34 acts as a reference for holding the thirty degree bank, and the vertical gyro automatically holds the aircraft at that flight attitude.

Through use of a rate sensing device, the roll rate gyroscope, I have been able to avoid the overshooting effect shown by curve 102 of FIGURE 2. Since the synchronizer potentiometer wiper 34 balances both the vertical and roll rate gyroscope signals, the potential at wiper 34 is slightly larger in magnitude than the potential at vertical gyro wiper 22 while the roll maneuver is being made. For example, and again with reference to FIGURE 2 and the thirty degree and thirty volt figures used above, when the roll angle reaches point 108 on the graph or approximately 25 degrees, there is a negative 25 volt potential at wiper 22, a negative five volt potential at wiper 12, and a positive 30 volt potential at wiper 34. Thus, although the roll angle is only twenty-five degrees as indicated by point 108 on the diagram, indicator 30 is operated by a positive thirty volt potential, which corresponds to the desired thirty degree angle as indicated by point 107 on the graph. The pilot releases his stick at point 103 along curve 101, which would occur at an earlier time than in the above example where a roll rate gyroscope was not used. This difference in time is indicated by points 105 and 106 on the graph. Thus, when the stick is released, wiper 34 is held at the positive thirty volt potential, the potential at wiper 22 gradually increases in magnitude to a negative thirty volts, and the potential at wiper 14 gradually decreases in magnitude to zero volts, and the plane is thereby caused to approach the desired thirty degre flight attitude along curve 101. Thus, the roll rate gyroscope signal effectively anticipates the tendency of the aircraft to continue its rolling movement when the control stick is released by the pilot.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A control system for a movable object, comprising: control means, effective when operated to move said object from a normal position; means for operating said control means; means responsive to movement of said object for generating a first signal proportional to the displacement of said object from said normal positon; means responsive to said movement for generating a second signal proportional to the rate of change of said displacement; means responsive to said first and second signals for generating a third signal to null the algebraic sum of said first and second signals; and means responsive to the termination of operation of said operating means for maintaining said third signal, said rate of change of said displacement being effective to carry said object through its position at the time of said termination and into a position where said third signal is nulled by said first signal.

2. A control system for a movable craft comprising, means for moving said craft about an axis from a first attitude to a desired new attitude, means responsive to the rate of change of craft attitude for generating a first signal, means responsive to the magnitude of change of craft attitude for generating a second signal, synchronizing means for generating a third signal, a motor, means responsive to operation of said first mentioned means for operatively connecting the input of said motor to said three signal generators and thereby driving said motor responsive to the algebraic sum of said three signals, controlling means driven by said motor to operate said synchronizing means so as to maintain a null condition at said motor input, termination of operation of said first mentioned means being effective to open said operative connection and thereby prevent further operation of said motor, whereupon the angular momentum of said craft about said axis carries said craft past the attitude at which said termination occurs to thereby increase said second signal and decrease said first signal until said third signal is balanced by said second signal at the desired new craft attitude.

3. A control system for a movable craft comprising, torque applying means, means operated responsive to operation of said first means for moving said craft about an axis away from a predetermined attitude, motor means, means for generating a first signal responsive to attitude change and attitude change rate of said craft, connecting means operated responsive to operation of said first mentioned means for connecting said generating means to operate said motor means, follow-up means driven by said motor means and connected to said generating means so as to null said first signal, means connected to said follow-up means for indicating simulated change of craft position, termination of operation of said first mentioned means being effective to terminate the operation of said connecting means to thereby terminate operation of said motor means, whereafter the angular momentum of said craft about said axis carries the craft past the position at which said termination of operation occurred and into the simulated position indicated by said last mentioned means.

4. A control system for a dirigible aircraft of a fixed-wing type comprising: a control surface for steering said aircraft; means for generating a first reference signal corresponding to any predetermined attitude of said aircraft; means for generating a second signal proportional to the change of aircraft attitude; means for generating a third signal proportional to the rate of change of aircraft attitude; circuit means for connecting said signals in a control bridge having an output signal proportional to the algebraic sum of said first, second and third signals; power means for driving said control surface; first control means for reversibly actuating said power means; means for connecting said control bridge output to drive said first control means in a manner to steer said craft so as to cause the sum of said second and third signals to become equal and opposite to said first signal and thereby null said output signal and stabilize said aircraft in the attitude corresponding to said first signal; second control means for reversibly actuating said power means to thereby steer said craft and cause a change in said second and third signals in accordance with the magnitude and rate of aircraft attitude change; means for changing said first signal; and means operative during the operation of said second control means to transfer said control bridge output from said first control means to said first signal changing means to thereby null said output signal by changing said first signal responsive to said change in said second and third signals, said first signal being effective upon termination of operation of said second control means to stabilize said aircraft in the new attitude caused by operation of said second control means; means connected to said first reference signal generating means for indicating simulated change of aircraft attitude, said rate of aircraft attitude change being effective to carry the aircraft past the attitude at which said termination occurred and into the simulated attitude indicated by said indicating means whereat said changed referenced signal is nulled by said second signal.

5. The apparatus of claim 1, wherein the means for generating the second signal is a position change rate sensing device positioning a signal generator in accordance with the magnitude of rate of change in position.

6. The apparatus of claim 5, wherein the displacement and rate of change of displacement are the angular displacement from a normal position and the rate of change of angular displacement.

References Cited in the file of this patent

UNITED STATES PATENTS

| 2,674,423 | Noxon | Apr. 6, 1954 |
| 2,797,379 | Young | June 25, 1957 |
| 2,890,844 | Cooper et al. | June 16, 1959 |